Nov. 13, 1923.  
W. E. BURGESS  
ELECTRIC WATER HEATER  
Filed June 15, 1922    2 Sheets-Sheet 2
1,474,104
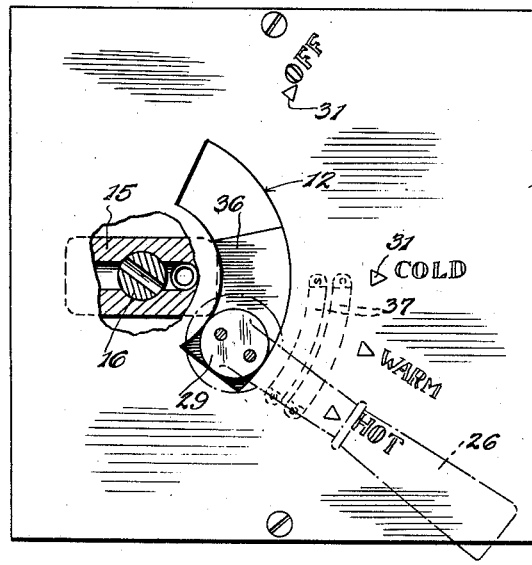
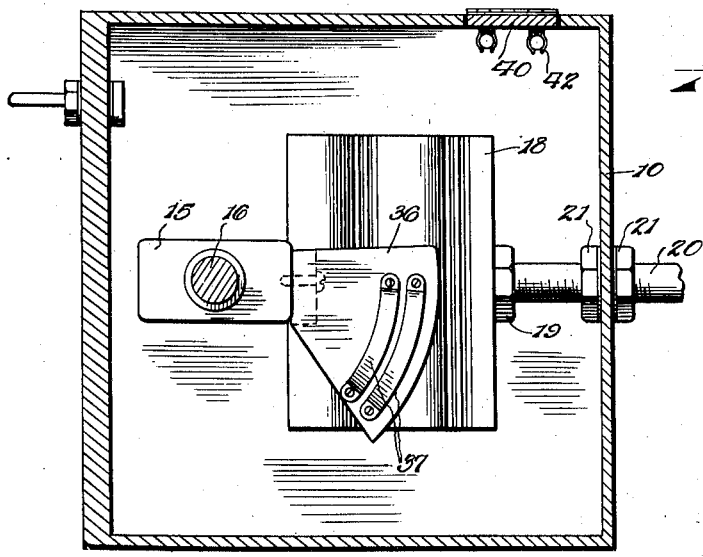
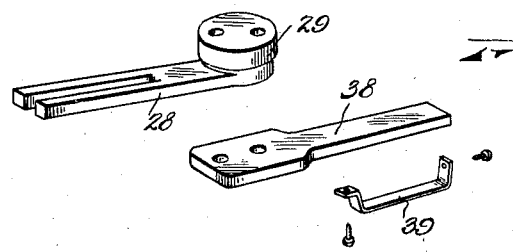
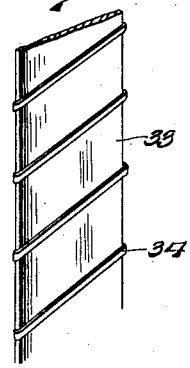
Inventor  
*W. E. Burgess.*  
By  
*Lacy & Lacy*, Attorneys Patented Nov. 13, 1923.

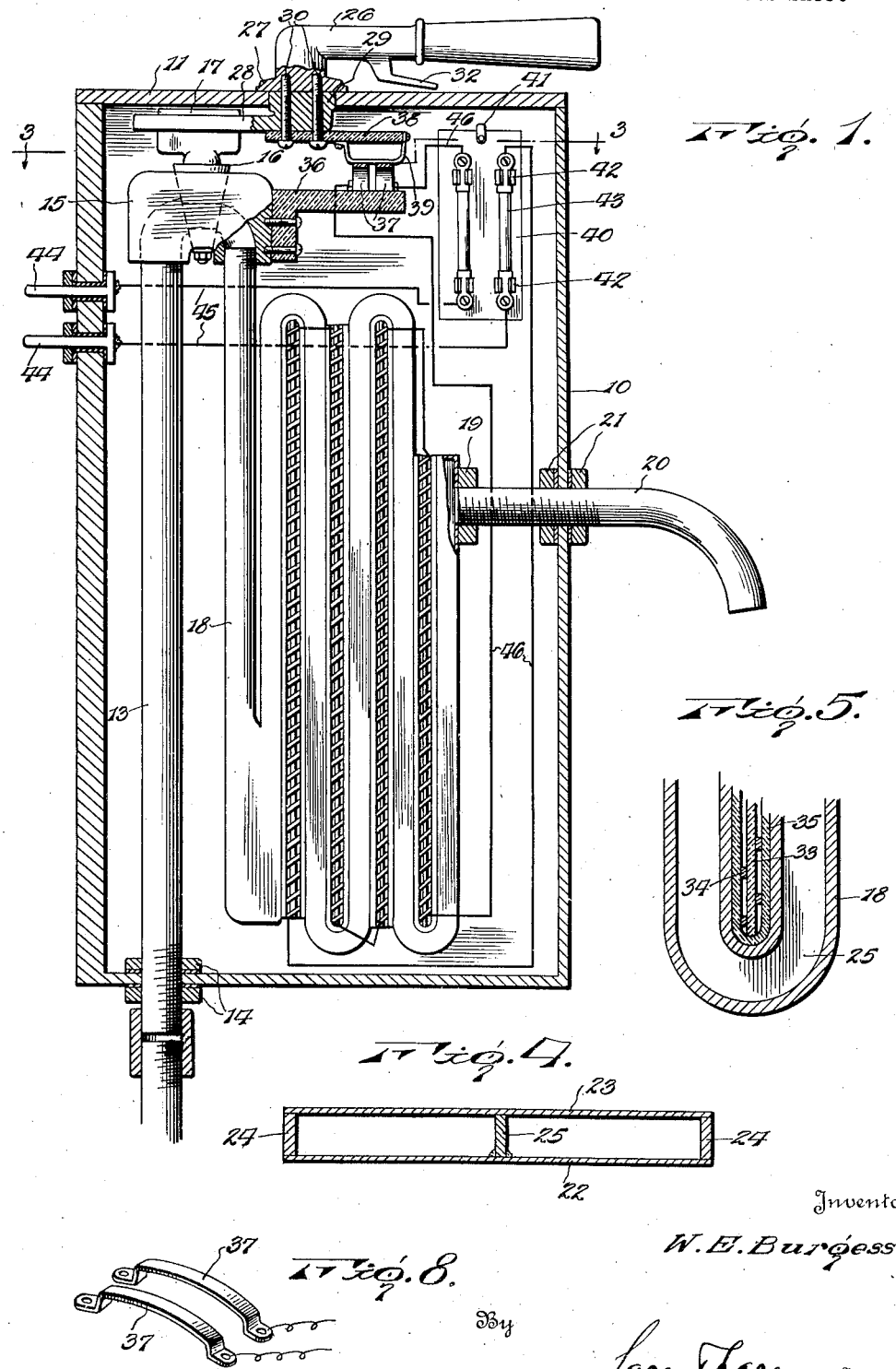

1,474,104

UNITED STATES PATENT OFFICE.

WILLIAM EDGAR BURGESS, OF NEW ORLEANS, LOUISIANA, ASSIGNOR OF ONE-FIFTH TO GEORGE F. SPENCE AND TWO-FIFTHS TO ADOLPH STEINHARDT, BOTH OF NEW ORLEANS, LOUISIANA.

ELECTRIC WATER HEATER.

Application filed June 15, 1922. Serial No. 568,559.

*To all whom it may concern:*

Be it known that I, WILLIAM EDGAR BURGESS, a citizen of the United States, residing at New Orleans, in the parish of Orleans and State of Louisiana, have invented certain new and useful Improvements in Electric Water Heaters, of which the following is a specification.

This invention relates to an improved electric water heater or faucet and seeks, as one of its principal objects, to provide a device of this character which will function to deliver a flow of hot water with a minimum consumption of current.

The invention has as a further object to provide a device wherein the temperature of the water may be readily controlled.

Another object of the invention in this connection, is to provide a device wherein the temperature of the water will be controlled through regulation of the rate of flow of the water, thus eliminating any mechanism for regulating the current to the heating elements of the device.

A still further object of the invention is to provide a device wherein a single lever will be employed for not only controlling the flow of water but also controlling the flow of current to the heating elements so that when the water is turned on, the heating elements will be energized and vice versa.

A further important object of the invention is to provide a device which cannot become burnt out or otherwise injured due to trapping of heated water in the device.

Still another object of the invention is to provide a device embodying a heating column of such construction that the water will be brought in contact with a maximum heated wall surface for a given length of the column.

And the invention has as a still further object to provide a device wherein the water column will be in the nature of a tortuous tube and wherein the side walls of the column will be prevented from collapsing through sudden temperature changes.

Other and incidental objects will appear hereinafter.

In the drawings:

Figure 1 is a vertical sectional view through my improved faucet,

Figure 2 is a top plan view of the device, parts being broken away and shown in section, Figure 3 is a sectional view on the line 3—3 of Figure 1, looking in the direction of the arrows, Figure 4 is an enlarged transverse sectional view through the tube of the water column, Figure 5 is an enlarged fragmentary vertical sectional view through a portion of the water column, this view particularly showing the mounting of the heating elements, Figure 6 is a fragmentary perspective view showing the core of one of the heating elements and illustrating the manner in which the resistance ribbon is wound about the core, Figure 7 is a disassembled perspective view of the switch employed in connection with the control lever of the device, and Figure 8 is a perspective view of the fixed contacts employed to coact with the switch.

In carrying the invention into effect, I employ a casing 10 closed at its upper end by a cover 11 in which is formed an arcuate slot 12. Leading through the bottom wall of the casing is an inlet pipe 13 fixed to said wall by jam nuts 14. As suggested in Figure 1, an appropriate water supply pipe is connected to the lower end of the inlet pipe 13 and mounted upon the upper end of the latter pipe is a valve casing 15, rotatably mounting a valve 16 having a flattened head 17. Connected at one end to the valve casing is a tortuous heating column 18 having a series of U-shaped bends therein, the sides of which are parallel to each other. Mounted upon the column at its opposite end is a boss 19 and threaded through said boss is an outlet pipe 20 extending through the front wall of the casing, the pipe being fixed to said wall by jam nuts 21. Thus, as will be seen, the column 18 is supported within the casing by the pipes 13 and 20.

As shown in Figure 4, the column is formed from a flat tube which is preferably of copper. In constructing this tube, I employ parallel side walls 22 and 23, end walls 24, and a medially disposed spacing strip or partition 25. Initially, the tube is straight and is built up by first brazing or otherwise securing the end walls 24 upon the side wall 22. The spacing strip is then soldered or otherwise fixed upon said side wall when the side wall 23 is brazed or otherwise secured at its margins to the end walls, closing the tube. The tube is then bent longitudinally to define the heating column. In thus constructing the tube it becomes feasible to use the spacing strip 25 and, in this connection, particular attention is directed to the function of this strip. As will be observed, the tube is relatively wide in proportion to the major thickness of the tube, the side walls 22 and 23 being spaced close to each other. This structure is followed in order that the column may have a large wall surface in proportion to the length thereof while the water flowing through the column will be confined in a relatively thin sheet between the side walls of the tube. These side walls are constructed as thin as possible in order that heat may be readily transmitted therethrough to the water flowing through the column and it has been found by test that, due to the width of the walls said walls, under sudden temperature changes, will, in the absence of the spacing strip, collapse toward each other to thus choke and practically cut off the flow of water through the tube. Accordingly, the spacing strip is employed to prevent such collapse of the side walls of the tube and, as will be seen, the strip will function to maintain said walls equally spaced apart throughout their length so that the water may at all times have unobstructed flow through the tube. As shown in Figure 1, the end of the column which attaches to the valve casing 15 is cylindrical in shape so that the column may be threaded into the casing.

Mounted upon the cover 11 of the casing is a control lever 26 provided at its inner end with a flange 27 to overhang the slot 12 resting upon the cover and secured to the lever to extend horizontally within the casing is a fork 28 straddling the head 17 of the valve 16. As shown in Figure 7, the fork is provided at its inner end with a cylindrical head 29. This head is formed to fit through the slot 12 abutting the inner end of the lever 26 and extending through the head are spaced screws 30 securing the fork upon the lever and slidably connecting the lever with the cover 11. Thus, as will be seen, the lever may be shifted for swinging the fork within the slot 12 and rotating the valve 16 to control the flow of water through the faucet. As shown in Figure 2, the casing is preferably provided with a series of indicators 31 successively labeled Off, Cold, Warm and Hot, while the lever is provided at its lower side with a pointer 32 to cooperate with said indicators so that the lever may be readily positioned to obtain a flow of water of the desired temperature.

Packed between the sides of the bends of the heating column 18 is a plurality of heating elements each including a preferably mica core or strip 33 about which is wrapped, as shown in detail in Figure 6, a resistance ribbon 34. Overlying the ribbon of each of said elements is an insulating strip 35 which is also of mica, uncut, unstained mica being employed in each instance so as to withstand extreme temperatures. The mica strips are as thin as possible and, as shown in Figure 5, are looped about the cores 33 of said elements to fit the bends of the column lying flat against the confronting walls of the sides of said bends. Mounted upon the valve casing 15 is a preferably fiber bracket 36 carrying arcuate spring contacts 37 and secured to the head 29 of the fork 28 by the screws 30 is a switch arm 38. This arm is also preferably of fiber and mounted upon said arm is a spring contact 39 to cooperate with the contacts 37. Hinged upon one side wall of the casing 10 is a door 40 normally held closed by a catch 41, and mounted upon said door at its inner side are fuse clips 42 in which are removably held appropriate fuses 43. Mounted upon the back wall of the casing are terminals 44 suitably insulated with respect to said wall. These terminals are adapted to receive any appropriate socket connecting the terminals with a source of current and leading from the terminals to corresponding ends of the fuses are circuit wires 45. The heating elements are connected in series and other circuit wires 46 connect said elements with the opposite ends of the fuses through the switch contacts 37.

As will now be seen in view of the preceding description, when the control lever 26 is shifted to open the valve 16 the switch contact 39 will be moved into engagement with the contacts 37 of the switch for closing a circuit through the heating elements so that the walls of the heating column 18 will be heated for heating the water flowing therethrough. As will be noted, no attempt is made to vary the flow of current through said element for varying the temperature thereof but, on the other hand, the temperature of the water issuing from the pipe 20 is controlled entirely by regulating the flow of water, an accelerated flow acting to reduce the temperature of the water discharged and a restricted flow acting to increase the temperature of the water. As brought out in Figure 2, the valve 16 will, when moved from closed position, in which position the pointer 32 will stand over the indicator labeled "Off," be rotated to full open position before the switch contact 39 reaches the contacts 37. Accordingly, a maximum flow of cold water, or any desired flow of cold water less than maximum, may be had. However, as the control lever 26 is further shifted to cause continued rotation of the valve, the valve will be gradually closed for cutting off the flow of water so that the temperature of the water issuing from the pipe 20 will be proportionately increased. However, it is to be noted that after the valve reaches full open position and the rotation thereof is continued, the head 29 of the fork 28 will, as also brought out in Figure 2, abut the adjacent end wall of the slot 12 for limiting the valve partially open. Accordingly, the valve cannot be closed while the circuit is closed through the heating elements to cause the device to become burnt out or to trap hot water in the heating column and thereby cause possible other injury.

Having thus described the invention, what is claimed as new is:

1. In an electric water heater, a heating column, a heater for heating the column, means controlling energization of the heater, means operating the first means and controlling flow of water through the column movable from a position permitting maximum flow to restrict the flow and simultaneously energize the heater, and means limiting the second means to permit partial flow when the heater is energized.

2. In an electric water heater, a casing, a heating column within the casing, a valve controlling flow of water through the column, a lever slidable upon a wall of the casing, and means upon the lever for operating said valve.

3. In an electric water heater, a casing, a heating column within the casing, a rotatable valve controlling flow of water through the column, a lever slidable upon a wall of the casing, and a fork upon the lever engaging the valve for rotating the valve when the lever is shifted.

4. In an electric water heater, a casing, a heating column therein, a valve controlling flow of water through the column, an operating lever for the valve mounted on the casing, and means connecting said lever with the valve, the valve and said means being housed by the casing.

5. In an electric water heater, a casing, a heating column therein, a valve controlling flow of water through the column, an operating lever for the valve mounted on the casing, and means securing the lever against displacement and connecting the lever with the valve common to the valve and lever.

6. In an electric water heater, a casing, a heating column therein, a valve controlling flow of water through the column, a wall of the casing being provided with a slot, an operating lever for the valve, and means extending through said slot securing the lever against displacement and connecting the lever with the valve.

7. In an electric water heater, a casing, a heating column therein, a valve controlling flow of water through the column, a wall of the casing being provided with a slot, an operating lever for the valve, and means extending through said slot securing the lever against displacement and connecting the lever with the valve, said means being selectively engageable with the end walls of said slot for limiting the valve in its movement in opposite directions.

8. In an electric water heater, a casing, a heating column therein, a rotatable valve controlling flow of water through the column, a wall of the casing being provided with a slot, an operating lever for the valve, and means extending through said slot securing the lever against displacement and connecting the lever with the valve, said means being engageable with one end wall of the slot for limiting the valve in closed position and engageable with the opposite end wall of the slot for limiting the valve partially open.

9. In an electric water heater, a casing, a heating column therein, a rotatable valve controlling flow of water through the casing, an operating lever slidable upon a wall of the casing in an arcuate path, and means within the casing connecting the lever with the valve for rotating the valve when the lever is shifted.

10. In an electric water heater, the combination of a fluid conductor, a heater for heating said conductor, means controlling energization of the heater, a valve controlling flow of water through said conductor and movable in a continuous direction from closed position to full open position and again to closed position, means operating said first mentioned means and the valve movable for shifting the valve from closed position to full open position without energizing the heater and further shifting the valve in the same direction from full open position toward closed position and simultaneously energizing the heater at constant current strength, and means limiting said second mentioned means before the valve is closed while the heater is energized.

11. In an electric water heater, the combination of a fluid conductor, a heater for heating said conductor, means controlling energization of the heater, a valve controlling flow of water through said conductor, means operating said first mentioned means and the valve movable for shifting the valve from open position toward closed position and simultaneously energizing the heater at constant current strength, and means limiting said second mentioned means before the valve is closed while the heater is energized.

12. In an electric water heater, a casing, a heating column therein, an inlet pipe extending into the casing and connected to said column, a valve interposed in said pipe within the casing, a heater for heating the column, means controlling energization of the heater, and means mounted for movement directly upon a wall of the casing and extending into the casing to coact with the valve and said first mentioned means for actuating the same.

In testimony whereof I affix my signature.

WILLIAM EDGAR BURGESS. [L. S.]